United States Patent
Yao et al.

(10) Patent No.: US 7,622,420 B1
(45) Date of Patent: Nov. 24, 2009

(54) CATALYST COMPOSITION FOR PREPARING HYDROXYLAMINE

(75) Inventors: Pin-To Yao, Kaohsiung (TW); Chun-Kao Wang, Kaohsiung (TW); Cheng-Fa Hsieh, Kaohsiung (TW)

(73) Assignee: China Petrochemical Development Corporation, Taipei (TW)

( * ) Notice: Subject to any disclaimer, the term of this patent is extended or adjusted under 35 U.S.C. 154(b) by 0 days.

(21) Appl. No.: 12/454,962

(22) Filed: May 27, 2009

(30) Foreign Application Priority Data

Nov. 20, 2008 (TW) ............................... 97144810 A

(51) Int. Cl.
| | |
|---|---|
| B01J 23/00 | (2006.01) |
| B01J 23/38 | (2006.01) |
| B01J 23/40 | (2006.01) |
| B01J 23/42 | (2006.01) |
| B01J 23/44 | (2006.01) |
| B01J 23/54 | (2006.01) |
| B01J 23/56 | (2006.01) |
| B01J 23/60 | (2006.01) |
| B01J 23/62 | (2006.01) |
| B01J 23/64 | (2006.01) |
| B01J 23/644 | (2006.01) |

(52) U.S. Cl. ...................... 502/339; 502/325; 502/333; 502/334; 564/300

(58) Field of Classification Search ....................... None
See application file for complete search history.

(56) References Cited

U.S. PATENT DOCUMENTS

| 4,158,047 A | * | 6/1979 | van de Moesdijk et al. | . 423/387 |
| 5,792,439 A | * | 8/1998 | van Lieshout et al. | ........ 423/387 |
| 7,122,501 B2 | * | 10/2006 | Paparatto et al. | ............ 502/339 |

FOREIGN PATENT DOCUMENTS

| GB | 1387725 | 3/1975 |
| WO | WO 98/18717 | 5/1998 |

* cited by examiner

*Primary Examiner*—Melvin C Mayes
*Assistant Examiner*—Colin W Slifka
(74) *Attorney, Agent, or Firm*—Knobbe Martens Olson & Bear LLP

(57) ABSTRACT

This invention provides a catalyst composition for preparing hydroxylamine, which comprises palladium, a platinum compound, a germanium compound and a carrier, wherein a halogen concentration of the composition is no more than 10 ppm. The catalyst composition is prevented from poisoning by halogens, and therefore the catalyst composition has high selectivity and catalytic activity. Further, the weight ratio of palladium and platinum in the catalyst composition ranges from 100:1 to 1000:1, such that the catalyst composition can be used to solve the commonly observed problem, i.e., decreased selectivity due to the excessive amount of platinum.

9 Claims, No Drawings

_US 7,622,420 B1_

CATALYST COMPOSITION FOR PREPARING HYDROXYLAMINE

BACKGROUND OF THE INVENTION

1. Field of the Invention

The present invention relates to catalyst compositions, and more particularly, to a catalyst composition for preparing hydroxylamine.

2. Description of the Related Art

Industrial production of hydroxylamine is usually accomplished by coupling with other processes conducted sequentially in, for example, a hydroxylamine-oxime circulating system. Specifically, the processes performed are as follows: using phosphate as inorganic process liquor to catalytically reduce nitrate ions to hydroxylamine from nitric acid and hydroxylamine as raw materials (see equation [I] below); reacting the resultant hydroxylamine with cyclohexanone in an oximation reaction to form cyclohexane oxime (see equation [II] below); adding nitric acid to the resultant inorganic process liquor or adsorbing nitrous gas to form nitric acid in the resultant inorganic phosphate process liquor, to increase the amount of the nitrate ions needed (see equation [III] below), before entering into a hydroxylamine reactor to prepare hydroxylamine. The above processes are repeatedly performed.

Hydroxylamine Reaction

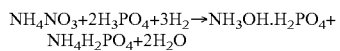

$$NH_4NO_3 + 2H_3PO_4 + 3H_2 \rightarrow NH_3OH.H_2PO_4 + NH_4H_2PO_4 + 2H_2O \qquad [I]$$

Oximation Reaction

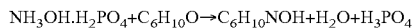

$$NH_3OH.H_2PO_4 + C_6H_{10}O \rightarrow C_6H_{10}NOH + H_2O + H_3PO_4 \qquad [II]$$

Formation of a Nitrate Ion

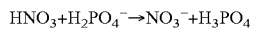

$$HNO_3 + H_2PO_4^- \rightarrow NO_3^- + H_3PO_4 \qquad [III]$$

GB1387725 has disclosed a palladium-platinum alloy catalyst used can catalyze hydroxylamine reactions, thereby increasing the reaction activity. However, a downside of using the catalyst was that as the amount of platinum increased, the activity and selectivity of the reaction decreased due to the halogen-containing platinum compound ($H_2PtCl_6$) being used as the source of platinum, thereby poisoning the catalyst by halogen ions.

WO98/18717 has disclosed a palladium-platinum catalyst composition, wherein the weight ratio of palladium and platinum ranged from 6:4 to 9.9:0.1, and preferably ranged from 7:3 to 9.5:0.5. Although the activity of hydroxylamine reaction can be increased by adding the aforesaid catalyst, the selectivity for the hydroxylamine was too low due to the excessive amount of platinum present in the catalyst.

In light of the above, it is clear that as the conventional catalyst compositions for catalyzing hydroxylamine reaction increased yields of hydroxylamine by increasing their catalytic activity, selectivity for the catalysts was reduced, thereby increasing consumptions of the catalyst compositions. Accordingly, it is desirable to develop a catalyst composition with high catalytic activity and selectivity.

SUMMARY OF THE INVENTION

In order to attain the above-mentioned objectives, the present invention provides a catalyst composition for preparing hydroxylamine, comprising palladium, platinum compound, germanium compound and a carrier, wherein a halogen concentration of the composition is no more than 10 ppm.

The source of the platinum compound in the catalyst composition of the present invention is halogen-free, preventing poisoning of the catalyst composition by halogens and the possible low selectivity and catalytic activity for catalyzing hydroxylamine reactions due to the poisoning. Therefore, the catalyst composition of the invention has high selectivity and high catalyst activity for catalyzing hydroxylamine reactions, such that the drawback of the conventional halogen-containing catalyst compositions is overcome.

The main catalyst of the catalyst composition of the present invention is palladium.

The platinum compound in the catalyst composition of the present invention can aid in the catalysis by palladium, to provide excellent catalytic effect. The platinum compound may be metal platinum or a compound that is derived from a halogen-free source, such a halogen-free compound, wherein a halogen is fluorine, chlorine, bromine, or iodine.

The weight ratio of palladium and platinum in the catalyst composition ranges from 100:1 to 1000:1, preferably ranges from 125:1 to 900:1, more preferably ranges from 250:1 to 750:1, and most preferably ranges from 375:1 to 500:1. In an embodiment of the present invention, the weight ratio of palladium and platinum may also range from 500:1 to 900:1. In another embodiment of the present invention, the weight ratio of palladium and platinum may also range from 125:1 to 500:1. In the conventional catalyst compositions, selectivity is decreased due to the excessive amount of platinum present in therein, and product costs are increased due to increased hydrogen consumptions, causing adverse effects on industrial preparations. It appears that the problem is overcome by the catalyst composition with high selectivity, of the present invention.

In addition to palladium and the platinum compound, the catalyst composition also comprises an activator for activating the catalyst composition for catalysis of the subsequent hydroxylamine reaction. It is known in the art that the activator contains a metallic element selected from the group consisting of Cu, Ag, Au, Cd, Ga, In, Tl, Ge, Sn, Pb, As, Sb, Bi and a combination thereof, or is a compound thereof. The compounds containing the above elements may also be used as catalysts, such as oxide, nitrate, phosphate, sulfate, halide, tartrate, oxalate, formate, and acetate. In one embodiment of the present invention, a germanium (Ge) compound is used as an activator for the catalyst composition. In a preferred embodiment, the germanium compound is germanium oxide.

The catalyst composition comprises a carrier for carrying the above-mentioned catalyst component. The carrier may be any material that is stable in a reaction medium. In an embodiment, the carrier may be one selected from the group consisting of graphite, activated carbon, silica gel, alumina and a combination thereof.

The present invention provides a catalyst composition for preparing hydroxylamine, comprising palladium, a platinum compound, a germanium compound and a carrier, wherein a halogen concentration of the composition is no more than 10 ppm, and the platinum compound is one selected from the group consisting of oxide, nitrate, carbonate, phosphate, sulfate and a combination thereof, the platinum may also be metal platinum, and the weight ratio of palladium and platinum ranges from 100:1 to 1000:1. In a preferred embodiment, the platinum compound in the catalyst composition is one selected from the group consisting of oxide, nitrate, carbonate, phosphate, sulfate and a combination thereof. In a more preferred embodiment, the platinum compound is one selected from the group consisting of platinum black, platinum oxide, platinum nitrate, $Pt(NH_3)_2(NO_2)_2$ and a combination thereof. In a further preferred embodiment, the platinum compound is may be $Pt(NH_3)_2(NO_2)_2$.

The catalyst composition may be prepared in-situ when it is applied in a hydroxylamine reaction process. In one embodiment, a commercially available palladium catalyst may be directly added to the platinum compound and the germanium compound to prepare the catalyst composition. Then, metal particles of platinum and germanium may be attached onto the carrier particles during activation. Afterwards, the catalyst composition can be readily applied to catalyze the hydroxylamine reaction. This advantage of allowing in-situ preparation is not achievable by any conventional hydroxylamine catalyst.

Moreover, in addition to providing the advantage of allowing in-situ preparation, the catalyst composition may be continuously added during catalysis, based on the catalytic activity and hydroxylamine reaction. Therefore, the catalyst composition of the present can be readily used, and can flexibly control the hydroxylamine process.

The catalyst composition of the present invention can increase the selectivity and activity of catalysis of hydroxylamine, reduce consumption of hydrogen and production cost, increase production capacity, and lower production cost.

DETAILED DESCRIPTION OF PREFERRED EMBODIMENTS

Illustrative embodiments of a catalyst composition of the present invention are described as follows with reference to examples 1-3 and comparative examples 1-9. Persons skilled in the art can easily conceive the other advantages and effects of the present invention based on the disclosure of the specification of the present invention.

As used herein, the term "halogen-free" refers to a halogen concentration of the catalyst composition is no more than 10 ppm, and is preferably halogen-free.

The catalyst composition of the present invention comprises palladium, a platinum compound, a germanium compound and a carrier, wherein a halogen concentration of the composition is no more than 10 ppm. In an embodiment of the present invention, the platinum compound in the catalyst composition is one selected from the group consisting of platinum oxide, platinum nitrate, platinum carbonate, platinum phosphate, platinum sulfate and a combination thereof. In a preferred embodiment, the platinum compound is one selected from the group consisting of platinum black, platinum oxide, platinum nitrate, $Pt(NH_3)_2(NO_2)_2$ and a combination thereof. In a more preferred embodiment, the platinum compound is $Pt(NH_3)_2(NO_2)_2$.

In an embodiment, the weight ratio of palladium and platinum in the catalyst composition ranges from 100:1 to 1000:1. In a preferred embodiment, the weight ratio of palladium and platinum in the catalyst composition ranges from 125:1 to 900:1. In another preferred embodiment, the weight ratio of palladium and platinum in the catalyst composition ranges from 250:1 to 750:1. In a more preferred embodiment, the weight ratio of palladium and platinum in the catalyst composition ranges from 375:1 to 500:1. On the other hand, in an embodiment, the weight ratio of palladium and platinum in the catalyst composition may range from 500:1 to 900:1. In another embodiment, the weight ratio of palladium and platinum in the catalyst compositions may be from 125:1 to 500:1. According to the above-mentioned ratios, the amount of platinum can be limited to a reasonable ratios, thereby increasing the selectivity for catalysis of hydroxylamine reaction.

In one embodiment, germanium (Ge) is used as an activator for the catalyst composition. In a preferred embodiment, the germanium compound is germanium oxide.

In another embodiment, the weight ratio of palladium and platinum in the catalyst composition ranges from 25:1 to 100:1. In a preferred embodiment, the weight ratio of palladium and platinum in the catalyst composition ranges from 50:1 to 200:7.

In a further embodiment, the carrier is one selected from graphite, activated carbon, silica gel and alumina.

In one embodiment, the catalyst composition comprises palladium, a platinum compound, a germanium compound and a carrier; wherein a halogen concentration of the composition is no more than 10 ppm, and the platinum compound is one selected from the group consisting of platinum oxide, platinum nitrate, platinum carbonate, platinum phosphate, platinum sulfate and a combination thereof; and the weight ratio of palladium and platinum ranges from 100:1 to 1000:1. In a preferred embodiment, the platinum compound in the catalyst composition is one selected from the group consisting of platinum oxide, platinum nitrate, platinum carbonate, platinum phosphate, platinum sulfate and a combination thereof. In a more preferred embodiment, the platinum compound is one selected from the group consisting of platinum black, platinum oxide, platinum nitrate, $Pt(NH_3)_2(NO_2)_2$ and a combination thereof. In a further preferred embodiment, the platinum compound is $Pt(NH_3)_2(NO_2)_2$.

In an embodiment of the present invention, the following steps may be conducted when the catalyst composition of the present invention is added to a hydroxylamine reaction: (a) using a palladium salt, a platinum salt, a germanium salt and a carrier to prepare the catalyst composition of the invention in-situ, wherein a halogen concentration of the composition is no more than 10 ppm; and (b) reducing nitrate in an acidic buffer solution by hydrogen to prepare hydroxylamine in the presence of the catalyst composition of the invention. The acidic buffer solution includes an acidic buffer and nitric acid or nitrate; wherein examples of the acidic buffer include sulfuric acid, phosphoric acid and acidic salts thereof. In an embodiment of the present invention, the platinum salt is one selected from the group consisting of platinum oxide, platinum nitrate, platinum carbonate, platinum phosphate, platinum sulfate and a combination thereof; in a preferred embodiment, the platinum salt is one selected from the group consisting of platinum black, platinum oxide, platinum nitrate, $Pt(NH_3)_2(NO_2)_2$ and combination thereof; in a more preferred embodiment, the platinum salt is $Pt(NH_3)_2(NO_2)_2$.

In a preferred embodiment, a 5 L jacketed high pressure stainless steel kettle with a 140 mm inner diameter is used to perform the hydroxylamine reaction. The reaction liquid which is delivered by pump, the catalyst and the gas which are delivered by the control of mass flowmeter to the kettle are fully mixed by the stirring blades and baffle plates in the kettle. A stainless steel filter disposed in the liquid discharge outlet of the kettle separates the catalyst from the liquid, the cooling water circulating in the coil pipe in the jacket and the kettle controls the temperature of the system, and a counterbalance valve disposed in the gas outlet controls the pressure inside the kettle.

In a preferred embodiment, palladium is the main catalyst for preparing the catalyst composition, and the activator is separately prepared, wherein the activator may comprise 3.45 moles of ammonium dihydrogen phosphate, 0.173 moles of phosphoric acid and 85 moles of water. The activator may also comprise only deionized water, to which halogen-free palladium compounds, platinum compounds, aqueous solutions of germanium oxide are added. The palladium catalyst and the activator are charged to the 5 L high pressure kettle and stirred, and oxygen is introduced after deoxidation by nitrogen.

In a preferred embodiment, the feed flow ratio of hydrogen and nitrogen ranges from 1:1 to 5:3; and the pressure of the high pressure kettle may range from normal atmospheric pressure to 40 atms, preferably range from 5 atms to 23 atms. The reaction temperature may range from ambient temperature to 100° C., preferably range from 30° C. to 60° C.

In a preferred embodiment, the weight ratio of palladium/platinum in the catalyst composition ranges from 1/1000 to 1/100, preferably ranges from 1/900 to 1/125.

In a preferred embodiment, the weight ratio of germanium/palladium in the catalyst composition ranges from 1/100 to 1/25, preferably ranges from 1/50 to 7/200.

In a preferred embodiment, a phosphate buffer solution is used to synthesize hydroxylamine phosphate, and the buffer solution comprises:

138 moL to 168 moL, and preferably 150 moL to 162 moL, of phosphoric acid;

120 moL to 162 moL, and preferably 132 moL to 150 moL, of ammonium nitrate;

6 moL to 30 moL, preferably 12 moL to 22 moL, of nitric acid; and 1200 moL to 2000 moL, and preferably 1320 moL to 1800 moL, of water.

There are no particular limitations on the catalytic conditions of the present invention. Typical reaction conditions at which nitrate ion is reduced by hydrogen is suitable. The reaction temperature may range from 20° C. to 100° C., preferably range 30° C. to 90° C., more preferably range from 40° C. to 65° C. The pressure may range from 10 kg/cm$^2$ to 30 kg/cm$^2$, preferably range from 18 kg/cm$^2$ to 26 kg/cm$^2$, more preferably range from 18 kg/cm$^2$ to 24 kg/cm$^2$. The feed flow of the liquid is adjusted according to the catalytic activity. As to the catalyst composition of the present invention, the feed flow ranges from 15 mL/min to 80 mL/min. The pH value of the liquid discharge ranges from 1.8 to 4.2.

In the following embodiment, the reaction activity and hydroxylamine selectivity are defined as follows:

Activity=hydroxylamine yield($g$)/palladium($g$)×hour($s$)

Hydroxylamine Selectivity=(2×hydroxylamine yield ($g$))/consumption of hydrogen ions×100%;

EXAMPLE 1

To a mixed solution consisting of 50 ml of an aqueous solution of germanium oxide with a concentration of 1000 ppm, and 2 L of activator consisting of 3.45 moles of ammonium dihydrogen phosphate, 0.173 moles of phosphoric acid and 85 moles of water, 25 g of 10 wt % of Pd/C catalyst (purchased from Degussa Company) and 25 ml of an aqueous solution of Pt(NH$_3$)$_2$(NO$_2$)$_2$ (purchased from Stream Company) with a concentration of 100 ppm were added to produce a catalyst composition that contained 10 wt % of palladium and 0.02 wt % of platinum. Then, the catalyst composition was added to the high pressure kettle to stir, and oxygen was introduced after dehydrogenation by nitrogen. The flow of hydrogen and nitrogen was maintained at 4.5 L/min, and system pressure was maintained at 5 kg/cm$^2$ and temperature at 30° C. After 1 hour, the flow of hydrogen and nitrogen was elevated to 15 L/min and 9 L/min, while the system pressure was controlled at 24 kg/cm$^2$ and temperature at 50° C. A buffer acidic liquid prepared by mixing 144 moles of ammonium nitrate, 145.2 moles of phosphoric acid, 19.2 moles of nitric acid and 1660.5 moles of water was pumped to the kettle for hydroxylamine reaction, to obtain hydroxylamine phosphate. The activity and selectivity of the catalyst composition were determined, and are shown in Table 1.

COMPARATIVE EXAMPLE 1

All steps were conducted in the same manner as in example 1, except that the catalyst composition prepared contained 10 wt % of palladium and no platinum. The activity and selectivity of the catalyst composition are shown in Table 1.

COMPARATIVE EXAMPLE 2

All steps were conducted in the same manner as in example 1, except that the catalyst composition prepared contained 8 wt % of palladium and 2 wt % of platinum. The activity and selectivity of the catalyst composition are shown in Table 1.

COMPARATIVE EXAMPLE 3

All steps were conducted in the same manner as example 1, except that the platinum compound in the catalyst composition prepared was 25 ml of an aqueous solution of H$_2$PtCl$_6$ (purchased from Stream Company) with a concentration of 100 ppm. The activity and selectivity of the catalyst composition are shown in Table 1.

TABLE 1

| | Pd (wt) | Pt (wt) | Selectivity (%) | Activity hydroxylamine (g)/catalyst (g) × hour(s) |
|---|---|---|---|---|
| Example 1 | 10 | 0.02 | 91.5 | 152.37 |
| Comparative Example 1 | 10 | 0 | 91.3 | 106.1 |
| Comparative Example 2 | 8 | 2 | 83.5 | 179.06 |
| Comparative Example 3 | 10 | 0.02 | 90.1 | 133.7 |

As shown in Table 1, addition of platinum increased the activity of a palladium catalyst. A catalyst composition with a high proportion (i.e., Pd:Pt=4:1) of platinum, as seen in comparative example 2, significantly increased the catalyst activity at the expense of the decreased selectivity. Comparatively, the weight ratio of palladium and platinum (i.e., Pd:Pt=500:1) in the catalyst composition of the present invention allowed the catalyst composition to have high activity and selectivity in a hydroxylamine reaction. Further, if palladium and platinum were present in equal proportions, the platinum salt of the catalyst composition in comparative example 3 contained chlorine while that of the present invention was chlorine-free. It appears from Table 1 that the catalyst composition of the present invention exhibited high activity and selectivity.

EXAMPLE 2

To a mixed solution consisting of 50 ml of an aqueous solution of germanium oxide with a concentration of 1000 ppm, and 2 L of activator consisting of 3.45 moles of ammonium dihydrogen phosphate, 0.173 moles of phosphoric acid and 85 moles of water, 25 g of 10 wt % of Pd/C catalyst (purchased from Degussa Company) and 50 ml of an aqueous solution of Pt(NH$_3$)$_2$(NO$_2$)$_2$ (purchased from Stream Company) with a concentration of 100 ppm were added to produce a catalyst composition that contained 10 wt % of palladium and 0.04 wt % of platinum. Then, the catalyst composition was added to the high pressure kettle to stir, and oxygen was introduced after dehydrogenation by nitrogen. The flow of hydrogen and nitrogen was maintained at 4.5 L/min, and system pressure was controlled at 5 kg/cm² and temperature at 30° C. After 1 hour, the flow of hydrogen and nitrogen was elevated to 15 L/min and 9 L/min, while the system pressure was maintained at 24 kg/cm² and temperature at 55° C. A buffer acidic liquid prepared by mixing 138 moles of ammonium nitrate, 150.3 moles of phosphoric acid, 20.8 moles of nitric acid and 1660.5 moles of water was pumped to the kettle for hydroxylamine reaction, to obtain hydroxylamine phosphate. The activity and selectivity of the catalyst composition were determined, and are shown in Table 2.

COMPARATIVE EXAMPLE 4

All steps were conducted in the same manner as in example 2, except that the catalyst composition prepared contained 10 wt % of palladium and no platinum. The activity and selectivity of the catalyst composition are shown in Table 2.

COMPARATIVE EXAMPLE 5

All steps were conducted in the same manner as example 2, except that the platinum compound in the catalyst composition prepared was 50 ml of an aqueous solution of $H_2PtCl_6$ (purchased from Stream Company) with a concentration of 100 ppm. The activity and selectivity of the catalyst composition are shown in Table 2.

TABLE 2

| | Pd (wt) | Pt (wt) | Selectivity (%) | Activity hydroxylamine (g)/catalyst (g) × hour(s) |
|---|---|---|---|---|
| Example 2 | 10 | 0.04 | 89.7 | 151.6 |
| Comparative Example 4 | 10 | 0 | 88.4 | 115.3 |
| Comparative Example 5 | 10 | 0.04 | 88.5 | 138.3 |

As shown in Table 2, addition of platinum increased the activity of a palladium catalyst. If palladium and platinum were present in equal proportions (i.e., Pd:Pt=250:1), the platinum salt of the catalyst composition in comparative example 5 contained chlorine while that of the present invention was chlorine-free. It appears from Table 2 that the catalyst composition of the present invention exhibited high activity and selectivity.

EXAMPLE 3

To a mixed solution consisting of 50 ml of an aqueous solution of germanium oxide with a concentration of 1000 ppm, and 2 L of activator consisting of 3.45 moles of ammonium dihydrogen phosphate, 0.173 moles of phosphoric acid and 85 moles of water, 25 g of 10 wt % of Pd/C catalyst (purchased from Degussa Company) and 100 ml of an aqueous solution of $Pt(NH_3)_2(NO_2)_2$ (purchased from Stream Company) with a concentration of 100 ppm were added to produce a catalyst composition that contained 10 wt % of palladium and 0.08 wt % of platinum. Then, the catalyst composition was added to the high pressure kettle to stir, and oxygen was introduced after dehydrogenation by nitrogen. The flow of hydrogen and nitrogen was maintained at 4.5 L/min, and system pressure was controlled at 5 kg/cm² and temperature at 30° C. After 1 hour, the flow of hydrogen and nitrogen was elevated to 15 L/min and 9 L/min, while the system pressure was maintained at 24 kg/cm² and temperature at 60° C. A buffer acidic liquid prepared by mixing 138 moles of ammonium nitrate, 150.3 moles of phosphoric acid, 20.8 moles of nitric acid and 1660.5 moles of water was pumped to the kettle for hydroxylamine reaction, to obtain hydroxylamine phosphate. The activity and selectivity of the catalyst composition were determined, and are shown in Table 3.

COMPARATIVE EXAMPLE 6

All steps were conducted in the same manner as in example 3, except that the catalyst composition prepared contained 10 wt % of palladium and no platinum. The activity and selectivity of the catalyst composition are shown in Table 3.

COMPARATIVE EXAMPLE 7

All steps were conducted in the same manner as in example 3, except that the platinum compound in the catalyst composition prepared was 100 ml of an aqueous solution of $H_2PtCl_6$ (purchased from Stream Company) with a concentration of 100 ppm. The activity and selectivity of the catalyst composition are shown in Table 3.

TABLE 3

| | Pd (wt) | Pt (wt) | Selectivity (%) | Activity hydroxylamine (g)/catalyst (g) × hour(s) |
|---|---|---|---|---|
| Example 3 | 10 | 0.08 | 88.7 | 188.8 |
| Comparative Example 6 | 10 | 0 | 87.8 | 142.9 |
| Comparative Example 7 | 10 | 0.08 | 86.6 | 100.2 |

As shown in Table 3, addition of platinum increased the activity of a palladium catalyst. If palladium and platinum were present in equal proportions (i.e., Pd:Pt=125:1), the platinum salt of the catalyst composition in comparative example 7 contained chlorine while that of the present invention was chlorine-free. It appears from Table 3 that the catalyst composition of the present invention exhibited high activity and selectivity in a hydroxylamine reaction at the same time.

EXAMPLE 4

To a mixed solution consisting of 50 ml of an aqueous solution of germanium oxide with a concentration of 1000 ppm, and 2 L of activator consisting of 3.45 moles of ammonium dihydrogen phosphate, 0.173 moles of phosphoric acid and 85 moles of water, 25 g of 10 wt % of Pd/C catalyst (purchased from Degussa Company) and 125 ml of an aqueous solution of $Pt(NH_3)_2(NO_2)_2$ (purchased from Stream Company) with a concentration of 100 ppm were added to produce a catalyst composition that contained 10 wt % of palladium and 0.108 wt % of platinum. Then, the catalyst composition was added to the high pressure kettle to stir, and oxygen was introduced after dehydrogenation by nitrogen. The flow of hydrogen and nitrogen was maintained at 4.5 L/min, and system pressure was controlled at 5 kg/cm² and temperature at 30° C. After 1 hour, the flow of hydrogen and nitrogen was elevated to 15 L/min and 9 L/min, while the system pressure was maintained at 24 kg/cm² and temperature at 45° C. A buffer acidic liquid prepared by mixing 138 moles of ammonium nitrate, 150.3 moles of phosphoric acid, 20.8 moles of nitric acid and 1660.5 moles of water was pumped to the kettle for hydroxylamine reaction, to obtain hydroxylamine phosphate. The activity and selectivity of the catalyst composition were determined, and are shown in Table 4.

COMPARATIVE EXAMPLE 8

All steps were conducted in the same manner as in example 4, except that the catalyst composition prepared contained 10 wt % of palladium and no platinum. The activity and selectivity of the catalyst composition are shown in Table 4.

COMPARATIVE EXAMPLE 9

All steps were conducted in the same manner as in example 4, except that the platinum compound in the catalyst composition prepared was 100 ml of an aqueous solution of $H_2PtCl_6$ (purchased from Stream Company) with a concentration of 125 ppm. The activity and selectivity of the catalyst composition are shown in Table 4.

Table 4

|  | Pd (wt) | Pt (wt) | Selectivity (%) | Activity hydroxylamine (g)/catalyst (g) × hour(s) |
|---|---|---|---|---|
| Example 1 | 10 | 0.1 | 89.5 | 128.1 |
| Comparative Example 8 | 10 | 0 | 91.1 | 83.4 |
| Comparative Example 9 | 10 | 0.1 | 88.2 | 85.3 |

As shown in Table 4, addition of platinum increased the activity of a palladium catalyst. If palladium and platinum were present in equal proportions (i.e., Pd:Pt=100:1), the platinum salt of the catalyst composition in comparative example 9 contained chlorine while that of the present invention was chlorine-free. It appears from Table 4 that the catalyst composition of the present invention exhibited high activity and selectivity in a hydroxylamine reaction at the same time.

The invention has been described using exemplary preferred embodiments. However, it is to be understood that the scope of the invention is not limited to the disclosed arrangements. The scope of the claims, therefore, should be accorded the broadest interpretation, so as to encompass all such modifications and similar arrangements.

What is claimed is:

1. A catalyst composition for preparing hydroxylamine, comprising palladium, a platinum compound, an activator, and a carrier, wherein the activator contains a metal selected from the group consisting of Cu, Ag, Au, Cd, Ga, In, Tl, Ge, Sn, Pb, As, Sb, Bi, and a combination thereof, and a halogen concentration of the catalyst composition is no more than 10 ppm; and wherein the weight ratio of palladium and platinum ranges from 125:1 to 900:1.

2. The composition of claim 1, wherein the platinum compound is one selected from the group consisting of platinum oxide, platinum nitrate, platinum carbonate, platinum phosphate, platinum sulfate and a combination thereof.

3. The composition of claim 1, wherein the platinum compound is one selected from the group consisting of platinum black, platinum oxide, platinum nitrate, $Pt(NH_3)_2(NO_2)_2$ and a combination thereof.

4. The composition of claim 1, wherein the platinum compound is $Pt(NH_3)_2(NO_2)_2$.

5. The composition of claim 1, wherein the activator is an oxide containing a metal selected from the group consisting of Cu, Ag, Au, Cd, Ga, In, Tl, Ge, Sn, Pb, As, Sb or Bi.

6. The composition of claim 5, wherein the activator is germanium oxide.

7. The composition of claim 1, wherein the carrier is one selected from the group consisting of graphite, activated carbon, silica gel, alumina and a combination thereof.

8. The composition of claim 1, wherein the weight ratio of palladium and platinum ranges from 250:1 to 750:1.

9. The composition of claim 8, wherein the weight ratio of palladium and platinum ranges from 375:1 to 500:1.

* * * * *